United States Patent
Beck et al.

(10) Patent No.: US 7,055,153 B2
(45) Date of Patent: *May 30, 2006

(54) INTER-OBJECT MESSAGING

(75) Inventors: Robert D. Beck, Portland, OR (US); Scott B. Lewis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/351,887

(22) Filed: Jan. 27, 2003

(65) Prior Publication Data

US 2003/0115373 A1    Jun. 19, 2003

Related U.S. Application Data

(60) Continuation of application No. 09/689,027, filed on Oct. 11, 2000, now Pat. No. 6,651,109, which is a division of application No. 08/828,885, filed on Mar. 31, 1997, now Pat. No. 6,742,050.

(51) Int. Cl.
*G06F 9/54* (2006.01)

(52) U.S. Cl. ............... 719/315; 719/330; 719/314

(58) Field of Classification Search ......... 719/310–332
See application file for complete search history.

(56) References Cited

U.S. PATENT DOCUMENTS

| | | | |
|---|---|---|---|
| 4,325,120 A | 4/1982 | Colley et al. ............... 711/202 |
| 5,136,716 A | 8/1992 | Harvey et al. |
| 5,173,939 A | 12/1992 | Abadi et al. |
| 5,235,642 A | 8/1993 | Wobber et al. |
| 5,315,657 A | 5/1994 | Abadi et al. |
| 5,329,619 A | 7/1994 | Page et al. ............... 709/203 |
| 5,379,426 A | 1/1995 | Foss et al. |
| 5,396,630 A | 3/1995 | Banda et al. |
| 5,414,852 A | 5/1995 | Kramer et al. |
| 5,450,593 A | 9/1995 | Howell et al. |
| 5,485,617 A | 1/1996 | Stutz et al. ............... 395/700 |
| 5,539,909 A | 7/1996 | Tanaka et al. |
| 5,551,035 A | 8/1996 | Arnold et al. |
| 5,619,710 A | 4/1997 | Travis et al. ............... 709/203 |
| 5,742,848 A | 4/1998 | Burgess |
| 5,751,962 A | 5/1998 | Fanshier et al. |
| 5,758,159 A | 5/1998 | Collet ............... 709/315 |
| 5,758,186 A | 5/1998 | Hamilton et al. |
| 5,761,421 A | 6/1998 | Van Hoff et al. |

(Continued)

OTHER PUBLICATIONS

Black, Andrew P. "The Eden Programming Language." Department of Computer Science, University of Washington. Technical Report Sep. 1, 1985.*

(Continued)

*Primary Examiner*—Lewis A. Bullock, Jr.
(74) *Attorney, Agent, or Firm*—Crystal D. Sayles

(57) ABSTRACT

A method of communication between a first object and a second object is disclosed. A first method call is made on an intermediary object from the first object. The first direct method call contains information regarding a location in memory of the intermediary object instead of a location in memory of the second object and a name of the method to be called on the second object. The name of the method to be called on the second object is delivered from the intermediary object to a message queue object. The name of the method to be called on the second object is accessed from the message queue object by the second object.

14 Claims, 6 Drawing Sheets

U.S. PATENT DOCUMENTS

| | | | |
|---|---|---|---|
| 5,778,222 | A | 7/1998 | Herrick et al. |
| 5,784,560 | A | 7/1998 | Kingdon et al. |
| 5,822,585 | A | 10/1998 | Noble et al. ............... 709/316 |
| 5,848,234 | A | 12/1998 | Chernick et al. ...... 395/200.33 |
| 5,892,946 | A | 4/1999 | Woster et al. .............. 709/316 |
| 5,941,945 | A | 8/1999 | Aditham et al. |
| 5,999,986 | A | 12/1999 | McCauley III et al. ..... 709/310 |
| 6,049,838 | A | 4/2000 | Miller et al. ............... 709/303 |
| 6,192,405 | B1 | 2/2001 | Bunnell |
| 6,192,419 | B1 | 2/2001 | Aditham et al. |
| 6,278,532 | B1 | 8/2001 | Heimendinger et al. |
| 6,282,652 | B1 | 8/2001 | Scheifler ................... 713/200 |
| 6,425,017 | B1 | 7/2002 | Dievendorff et al. ....... 709/315 |

OTHER PUBLICATIONS

Hsu, Felix Samson. "Reimplementing Remote Procedure Calls." University of Washington, Mar. 22, 1985.*

Bela Ban Dept. of Computer Science. "JavaGroups-Group Communication Patterns in Java". Jul. 31, 1998, p. 1-16.

Designing object-oriented synchronous groupware with COAST. Christian Schuckman, Lutz Kirchner, Jan Schummer, Jorg M. Haake. IPSI—Integrated Publication and Information Systems Institute. GMD- German National Research Center for Information Technology. Darmstadt, Germany. pp. 1-11.

Session Management for Collaborative Applications. W. Keith Edwards. Graphics, Visualization & Usability Center; College of Computing. Georgia Institute of Technology. Atlanta, Georgia. pp. 323-330.

Generic and Composable Latesomer Accomodations Service for Cetrlized Shared Systems. Goopel Chung, Prasun Dewan & Sadagopan Rajaram. Department of Computer Science, University of North Carolina at Chapel Hill, NC. pp. 1-19.

The Web meets MOO's, IRC and the MBone. Nathan Mates, Mika Nyström and Eve Schooler. Project Y Overview. pp. 1-13.

Girdley, Michael et al. "Web Programming with Java", Jul. 1996.

Erdos, Marlena et al. "Security Reference Model for the Java Developer's Kit 1.0.2" Nov. 13, 1996.

Omg. "Cobra Security Draft", Sep. 1995.

IBM Corp. 1994, "MQSeries Distributed Queue Management Guide".

IBM Corp. 1993, "MQSeries Application Programming Guide".

"Java Remote Method Invocation: Pure Java Distributed Computing", Downloaded from http://java.sun.com/marketing/collateral/rmi_ds.html on Sep. 7, 2001, pp. 1-7.

"Component Object Model (COM), DCOM, and Related Capabilities", Downloaded from http://www.sei.cmu.edu/str/descriptions/com_body.html on Sep. 7, 2001, pp. 1-11.

"Component-Based Software Development/COTS Integration", Downloaded from http://www.sei.cmu.edu/str/descriptions/cbsd_body.html on Sep. 7, 2001, pp. 1-9.

"Middleware:Software Technology Review", Downloaded from http://www/sei.cmu.edu/str/descriptions/middleware_body.html on Sep. 7, 2001, pp. 1-4.

"Remote Pocedure Call: Software Technology Review", Downloaded from http://www.sei.cmu.edu/str/descriptions/rpc_body.html on Sep. 7, 2001, pp. 1-4.

"Object Request Broker: Software Technology Review", Downloaded from http://www.sei.cmu.edu/str/descriptions/orb_body.html on Sep. 7, 2001, pp. 1-5.

"Using the Security Manager: Java Security", Downloaded from http://www.google.com/search?q=cac . . . 2+and+%22socket+factories%22&hl=en on Aug. 27, 2001, pp. 1-19.

Yialelis, Nicholas, et al., "A Security Framework Supporting Domain Based Access Control in Distributed Systems," Imperial College Research Report No. DoC 95/14, Sep. 15, 1995, 18 pages, Department of Computing, Imperial College, London, UK.

Yialelis, Nicholas, et al., "An Authentication Service Supporting Domain Based Access Control Policies," Imperial College Research Report No. DoC 95/13, Sep. 15, 1995, 12 pages, Department of Computing, Imperial College, London, UK.

Lupu, Emil C., et al., "A Policy Based Role Framework For Access Control," First ACM/NIST Role Based Access Control Workshop, Gaithersburg, USA, Dec. 1995, 9 pages, Department of Computing, Imperial College, London, UK.

Introduction to KeySAFE—Trusted Computer Base Components, Agorics, Inc., Los Altos, CA;7 pages; http://www.cis.upenn.edu/~KeyKOS/agorics/KeyKos/keysafe/Keysafe.html and http://www.cis.upenn.edu/~KeyKOS/agorics/KeyKos/keysafe/Trusted.html.

Van Doorn, Leendert, et al., "Secure Network Objects," Vrije Universiteit, Amsterdam, The Netherlands, and Digital Systems Research Center, Palo Alto, California USA; 11 pages.

Dean, Drew, et al., "Java Security: From HotJava to Netscape and Beyond," Department of Computer Science, Princeton University, Princeton, New Jersey; 11 pages.

Lampson, Butler W., "Protection" Xerox Corporation, Palo Alto, California; 10 pages.

Shoffner, Michael, et al., "Java and Web-Executable Object Security—How safe is safe?" Nov. 1996: Java and Web Security, Dr. Dobb's Software Tools for the Professional Programmer; 8 pages; http://www.ddj.com/print/documentID=13332.

* cited by examiner

INTER-OBJECT MESSAGING

This application is a continuation application of Ser. No. 09/689,027 now U.S. Pat. No. 6,651,109 which is a divisional of application Ser. No. 08/828,885, filed Mar. 31, 1997, now U.S. Pat. No. 6,742,050, filed on Oct. 11, 2000, entitled "Inter-Object Messaging", currently pending, and claims priority therefrom.

FIELD OF THE INVENTION

The present invention relates to object oriented programming. More specifically, the present invention relates to a secure method of communication between untrusted JAVA™ objects.

BACKGROUND OF THE INVENTION

JAVA™ is a portable language that generates intermediate code that can be downloaded and run on a machine with a JAVA™ interpreter. The portability of JAVA™ applets allows processing to be off-loaded to a local system that has the potential capability of performing the processing at a faster rate than the source of the applet.

Because applets are designed to be loaded from a remote site and then executed locally, security is an important issue. In order to prevent untrusted code from damaging the local system, web browsers with JAVA™ interpreters often implement safeguards that restrict what applets can do. Some safeguards include, preventing applets from running any local executable program and preventing applets from communicating with any host other than their originating host. Other safeguards include preventing applets from reading or writing the local computer's file system and preventing applets from finding information about the local client system other than the JAVA™ version used, the name and version of the operating system, the characters used to separate files, paths, and lines.

The safeguards implemented by web browsers, however, are ineffective in providing a secure method of communication between untrusted objects from the untrusted code and objects in the local system. The safeguards implemented by current web browsers allow trusted objects to communicate with other trusted objects in the local system by making direct method calls directly on the objects in the local system. Direct method calls are messages from one object to another that request the receiving object to carry out one of its methods. A direct method call typically consists of three parts: a reference to the receiver object, the name of the method in the receiver object to be executed, and any parameters that the method may require to fulfill its charge. If untrusted objects were allowed to make direct method calls to other objects in the local system, untrusted objects could potentially do damage to a file system, a network, invoke methods in an inappropriate manner, or negatively affect other parts of the local system.

Thus, a method for inter-object communication among objects that minimizes the dangers associated with allowing untrusted objects to make direct method calls is desired.

SUMMARY

A method of communication between a first object and a second object is disclosed. A first direct method call is made on an intermediary object from the first object. The first direct method call contains information regarding a location in memory of the intermediary object instead of a location in memory of the second object and a name of the method to be called on the second object. The name of the method to be called on the second object is delivered from the intermediary object to a message queue object. The name of the method to be called on the second object is accessed from the message queue object by the second object.

A method for requesting a channel of communication with a receiver object via a trusted intermediary is disclosed. A first direct method call is made to a session object to request a channel with the receiver object. A location in memory of a channel object is received from the session object on behalf of the receiver object.

A method of allocating a channel of communication is disclosed. A direct method call is received from a session object on behalf of a sender object requesting a channel of communication. The direct method call contains an object identifier (ID) of the sender object. A degree of access to grant the sender object is determined. A channel object with the degree of access appropriate for the sender object is created. A location in memory of the channel object is returned to the session object.

A method for arbitrating a channel of communication between a first object and a second object is disclosed. A first direct method call is received from the first object requesting a channel of communication with the second object. The first direct method call contains an object identifier (ID) of the first object and the second object. A second direct method call is made to the second object requesting the channel of communication on behalf of the first object. A location in memory of a channel object is received from the second object. The location in memory of the channel object is sent to the first object.

DESCRIPTION OF THE DRAWINGS

The present invention is illustrated by way of example and not by way of illustration in the figures of the accompanying drawings, in which like references indicate similar elements and in which.

DETAILED DESCRIPTION

A method and apparatus for providing secure communication between untrusted objects is described. In the following descriptions, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Network Overview

Figure 1:
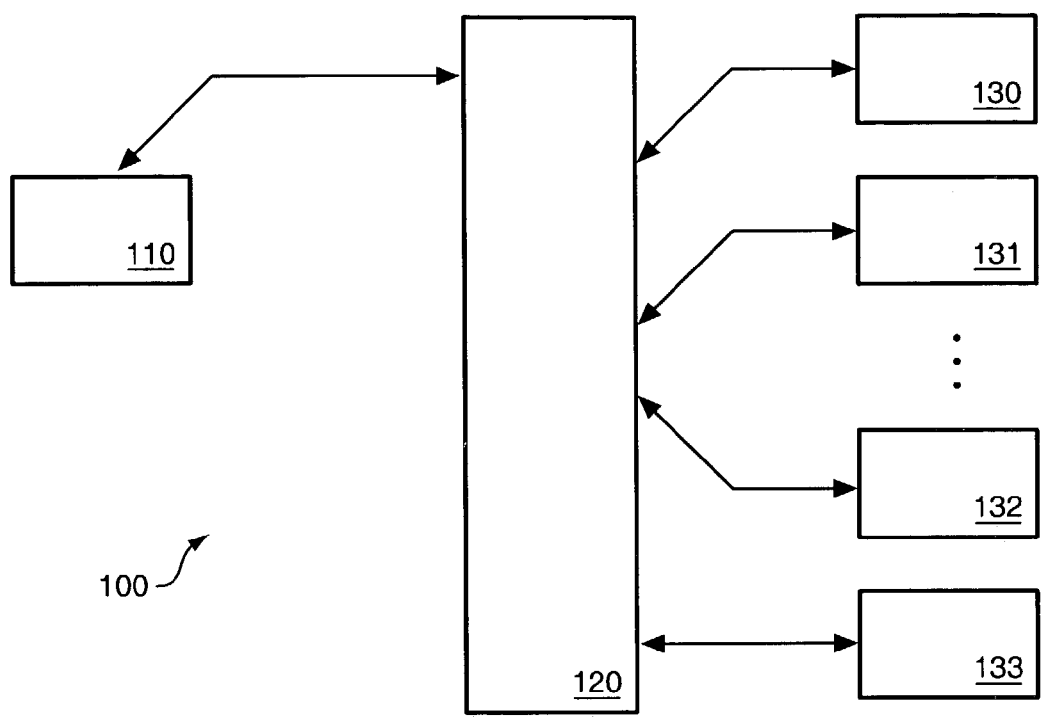
FIG. 1 illustrates a network in which the present invention is implemented.

FIG. 1 illustrates an exemplary network upon which an embodiment of the present invention is implemented. The network 100 includes a server 110 and a plurality of clients 130–133. The server 110 and the clients 130–133 interface with one another via transmission medium 120. In one embodiment of the present invention, transmission medium 120 provides an Internet connection. In an alternate embodiment of the present invention, transmission medium 120 provides other network connections.

The network 100 supports a multi-user communication infrastructure wherein objects in each of the clients 130–133 are downloaded and replicated onto the other clients 130–133 via the transmission medium 120 and the server 110. This provides a basic symmetry between the clients 130–133 and the server 110 and allows the processing of events to be done on each of the clients 130–133 instead of on the server 110. Objects that are replicated from other clients are considered untrusted objects. For example, objects originating from clients 131–133 that are replicated onto client 130 are considered by the client 130 to be untrusted objects. Likewise, objects originating from client 130 that are replicated onto clients 131–133 are considered by the clients 131–133 to be untrusted objects. According to an embodiment of the present invention, a method of communication is provided to allow a first object originating from a first client 130 to communicate with a second object originating from a second client 131 without giving the first object a location in memory of the second object. The methods that are requested by the first object on the second are routed to a trusted object created by the second object. Further, the first object cannot create or otherwise obtain a reference to the second object.

Hardware Overview

Figure 2:
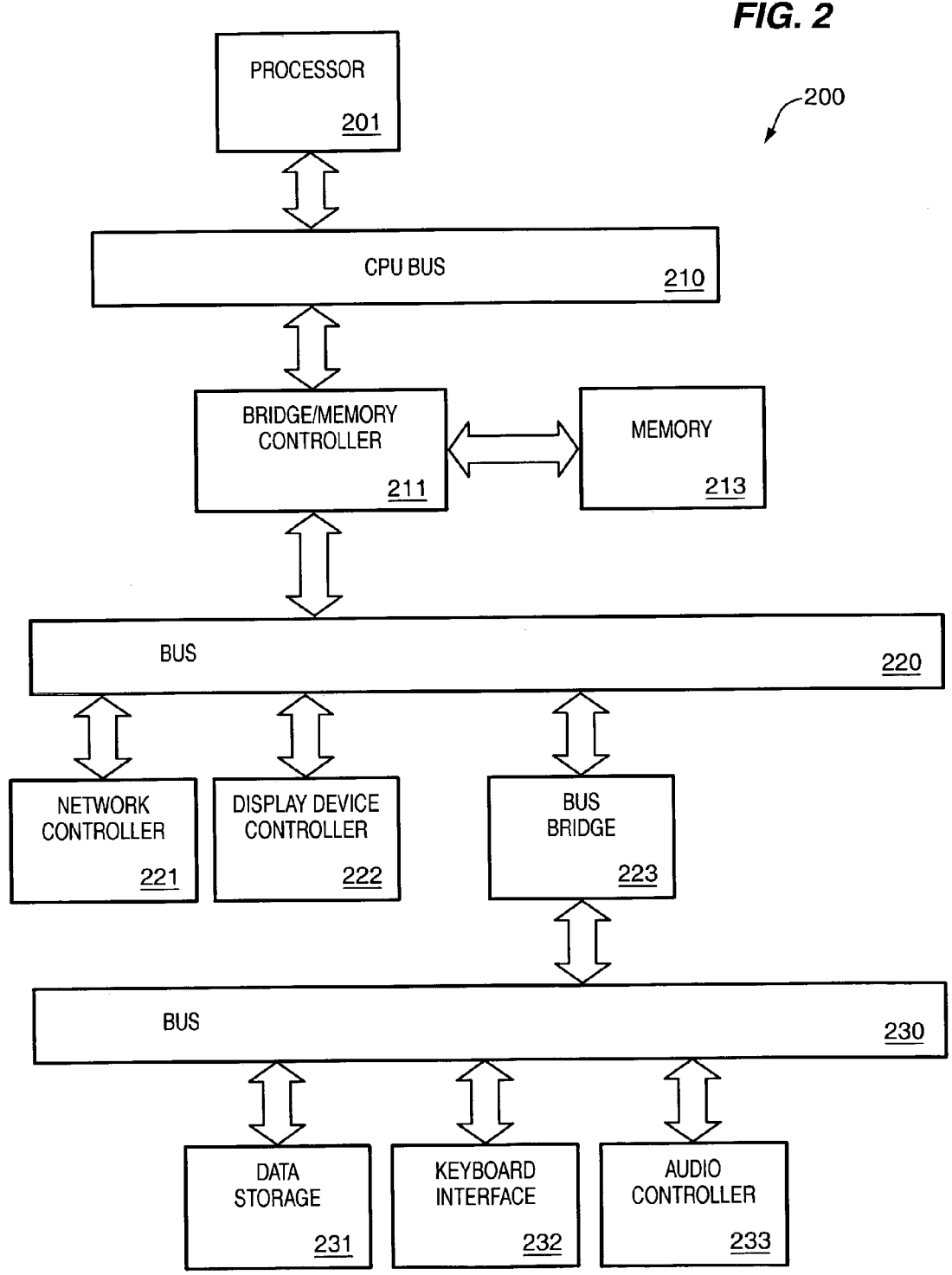
FIG. 2 illustrates a block diagram of a computer system implementing an embodiment of the present invention.

Referring to FIG. 2, an exemplary computer system upon which an embodiment of the present invention can be implemented is shown. The computer system 200 may be configured to be the server 110 or one of the clients 130–133 illustrated in FIG. 1. The computer system 200 comprises a processor 201 that processes digital data. The processor 201 can be a complex instruction set computing (CISC) microprocessor, a reduced instruction set computing (RISC) microprocessor, a very long instruction word (VLIW) microprocessor, a processor implementing a combination of instruction sets, or other processor device. The processor 201 is coupled to a CPU bus 210 which transmits signals between the processor 201 and other components in the computer system 200. In an alternate embodiment of the present invention, the computer system 200 includes a plurality of processors.

For the illustrated embodiment, a memory 213 comprises a dynamic random access memory (DRAM) device, a static random access memory (SRAM) device, or other memory devices. The memory 213 stores information or other intermediate data during execution by the processor 201. A bridge memory controller 211 is coupled to the CPU bus 210 and the memory 213. The bridge memory controller 111 directs data traffic between the processor 201, the memory 213, and other components in the client computer system 110 and bridges signals from these components to a high speed I/O bus 220.

For the illustrated embodiment, the high speed I/O bus 220 supports peripherals operating at high data throughput rates. The bus 220 can be a single bus or a combination of multiple buses. As an example, the bus 220 can comprise a Peripheral Components Interconnect (PCI) bus, a Personal Computer Memory Card International Association (PCMCIA) bus, or other buses. The bus 220 provides communication links between components in the computer system 200. A network controller 221 links a network of computers together and provides communication among the machines. A display device controller 222 is coupled to the high speed I/O bus 220. The display device controller 222 allows coupling of a display device to the computer system 200 and acts as an interface between the display device and the computer system 200. The display device receives information and data from the processor 201 through the display device controller 222 and displays the information and data to the user of the computer system 200.

For the illustrated embodiment, a bus bridge 223 couples the high speed I/O bus 220 to I/O bus 230. The bus bridge 223 comprises a translator to bridge signals between the high speed I/O bus 220 and the I/O bus 230.

The I/O bus 230 is used for communicating information between peripheral device which operate at lower throughput rates. The I/O bus 230 can be a single bus or a combination of multiple buses. As an example, the bus 230 can comprise an Industry Standard Architecture (ISA) bus, an Extended Industry Standard Architecture (EISA) bus or a Micro Channel Architecture (MCA) bus. The bus 230 provides communication links between components in the computer system 200. A keyboard interface 232 can be a keyboard controller or other keyboard interface. The keyboard interface 232 can be a dedicated device or can reside in another device such as a bus controller or other controller. The keyboard interface 232 allows coupling of a keyboard to the computer system and transmits signals from a keyboard to the computer system 200. A data storage device 231 can be a hard disk drive, a floppy disk drive, a CD-ROM device, a flash memory device or other mass storage device. An audio controller 233 operates to coordinating the recording and playing of sounds is also coupled to I/O bus 230.

The present invention is related to the use of the computer system 200 to facilitate communication between a first object and a second object. According to one embodiment, facilitating communication between the first object and the second object is performed by computer system 200 in response to the processor 201 executing sequences of instructions contained in the memory 213. Such instructions may be read into the memory 213 from other computer-readable mediums such as data storage device 231. Execution of the sequences of instructions contained in the memory 213 causes the processor to facilitate communication between the first object and the second object, as will be described hereafter. In alternative embodiments, hard-wired circuitry may be used in place of or in combination with software instructions to implement the present invention. Thus, the present invention is not limited to any specific combination of hardware circuitry and software.

Channel Negotiation

Figure 3:
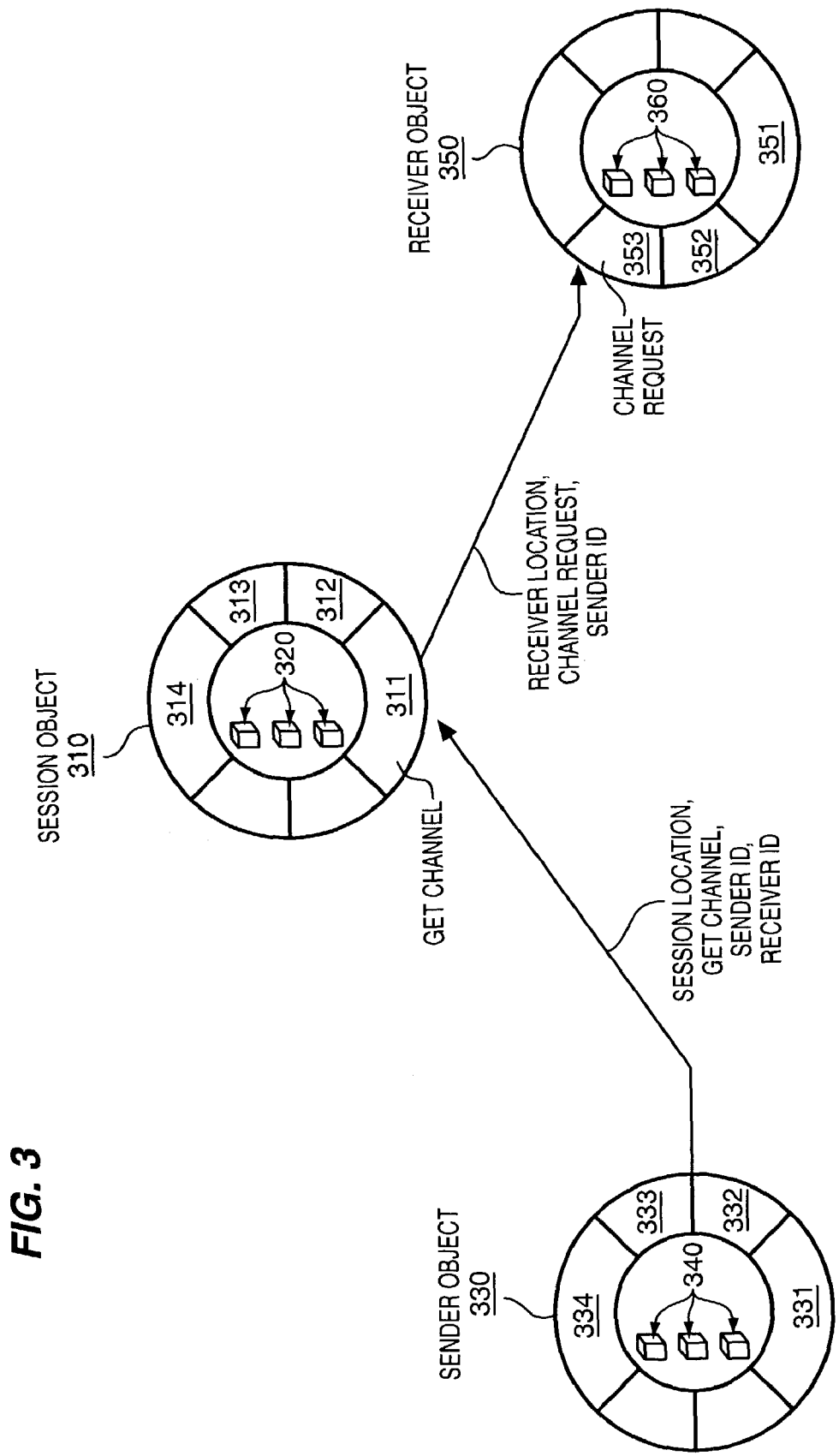
FIG. 3 illustrates how a channel of communication is negotiated according to an embodiment of the present invention.

FIG. 3 illustrates how a channel of communication is negotiated according to an embodiment of the present invention. A session object 310 is an object originating from a client 130–133. The session object 310 keeps track of the identity and the location in memory of the objects operating in its same run-time. The session object 310 operates as a mediator between a first object that wishes to communicate with a second object, but does not know the location in memory of the second object. The session object 310 includes a plurality of methods 311–314 that access a plurality of variables 320. The variables 320 in the session object 310 represent object identifiers (IDs) of the objects operating the same run-time as the session object 310. Each of the object IDs has a corresponding "handle" or a reference of the object. Information regarding the references and object IDs of the objects are stored on a table in the session object 310. According to an embodiment of the present invention, the session object 310 also has an associated object ID that is stored in the table. Since the session object 310 knows a reference of the different objects operating in its same run-time, the session object 310 can make a direct method call on any of the objects. According to an embodiment of the present invention, the reference is a location in memory.

A first object wishing to communicate with a second object is represented as a sender object 330. The sender object 330 originates from a client such as one of the clients 130–133 illustrated in FIG. 1. The sender object 330 includes a plurality of methods 331–334 that access a plurality of variables 340. The second object is represented as a receiver object 350. The receiver object 350 originates from a client such as one of the clients 130–133 illustrated in FIG. 1. The receiver object 350 includes a plurality of methods 351–353 that access a plurality of variables 360. The sender object 330 is considered an untrusted object by the computer system where the receiver object 350 originated. Likewise, the receiver object 350 is considered an untrusted object by the computer system where the sender object 330 originated.

The sender object 330 is made aware of the existence of the receiver object 350 and given an object identifier (ID) of the receiver object 350, by the session object 310, the receiver object 350, or other source, but is not given the location in memory of the receiver object 350. Without the exact location in memory of the receiver object 350, the sender object 330 may not make a direct method call on the receiver object 350.

In order to communicate with the receiver object 350, the sender object 330 negotiates a channel of communication with the receiver object via the session object 310. Both the sender object 330 and the receiver object 350 know the location in memory of the session object 310 and are able to make direct method calls on the session object 310. The session object 310 includes a method, represented as "Get Channel" 311, that communicates with the receiver object 350 on behalf of the sender object 330 and asks for a channel of communication. When called, the "Get Channel" 311 method is given the parameters that correspond to object ID of the sender object 330 requesting a channel of communication and the object ID of the receiver object 350. The session object 310 retrieves the location in memory corresponding to the receiver object 350 and makes a direct method call to the receiver object 350 calling a method in the receiver object 350 that evaluates requests for channel represented as "Channel Request" 353.

When called, the "Channel Request" 353 method is given the parameters that correspond to the object ID of the sender object 330 requesting the channel of communication. The receiver object 350 may reference information relating to the object ID of the sender object 330. The information relating to the object ID is used to determine whether to give a channel of communication to the sender object 330 and if a channel is to be given what type of channel of communication to give the sender object 330. If the information relating to the object ID of the sender object 330 indicates that the sender object 330 is a trustable object, the channel of communication may be an open channel that passes all requests from the sender object 330 to the receiver object 350. If however, the information relating to the object ID of the sender object 330 indicates that the sender object 330 is not a trustable object, no channel of communication may be given or a channel which allows only a predefined set of requests and parameters to be passed to the receiver object 350 may be given. The receiver object 350 returns either a reference of a channel object granted to the sender object 330 or a response that no channel is granted to the session object. The session object 330 conveys this information to the sender object 330 on behalf of the receiver object 350.

It should be appreciated that the session object 310 itself can be a sender object 330 wishing to negotiate a channel of communication with a receiver object 350. When the session object 310 wishes to negotiate a channel of communication with the receiver object 350, it makes a direct method call on the "Channel Request" 353 method on the receiver object 350 on its own behalf.

Inter-Object Messaging

Figure 4:
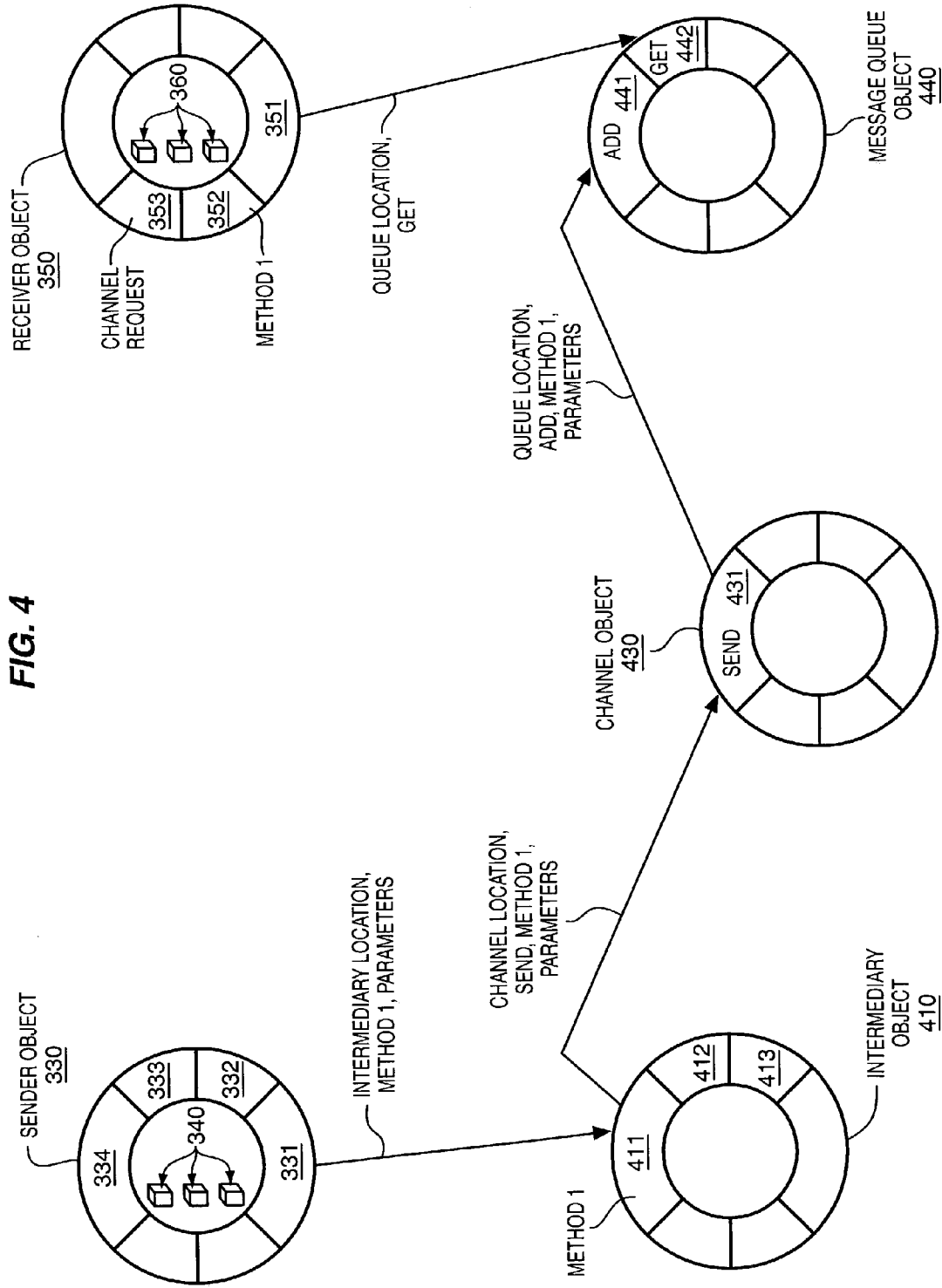
FIG. 4 illustrates how inter-object messaging is performed according to an embodiment of the present invention.

FIG. 4 illustrates how inter-object messaging is performed according to an embodiment of the present invention. When the sender object 330 receives the location in memory of a channel object 430 granted for communication with the receiver object 350, the sender object 330 creates an intermediary object 410. The intermediary object 410 includes a plurality of methods 421–423 that correspond to methods on the receiver object 350 that may be requested to be executed. According to one embodiment of the present invention, each of the methods on the intermediary object 410 has a name identical to a name of a method on the receiver object and the same parameters as the receiver objects. The methods on the intermediary object 410, however, perform different functions than those of their corresponding methods on the receiver object 350.

When the sender object 330 wishes to call a method in the receiver object 350, the sender object 330 calls the name of that method on the intermediary object 410. For example, the sender object 330 wishing to call a "Method 1" 352 on the receiver object 350 would instead call a "Method 1" 411 on the intermediary object 410. When called, a "Method 1" 411 on the intermediary object 410 is given the parameters necessary for executing the corresponding "Method 1" 352 on the receiver object 350, if necessary. The "Method 1" 411 on the intermediary object 410, makes a direct method call to the channel object 430 to direct the name of the method that was called and the parameters necessary for executing the method, if necessary, to the receiver object 350. The location in memory of the channel object 430 is given to the intermediary object 410 by the sender object 330. The method in the channel object 430 that is called by the intermediary object 410 is referenced as "Send" 431.

The channel object 430 is created by the receiver object 350 to serve as a communication channel between the sender object 330 and the receiver object 350. The channel object 430 includes a method, referenced as "Send" 431, that sends the name of a method and related parameters to a message queue object 440. According to one embodiment of the channel object 430, the "Send" method 431 forwards every method name and parameters received from the intermediary object 410 to the message queue object 440. According to an alternate embodiment of the channel object 430, the "Send" method 431 filters the method names and parameters received from the intermediary object 410 and only forwards the names and parameters that correspond to a predefined set of method names and parameters to the message queue object 440. It should be appreciated that the method names and parameters forwarded from the intermediary object 410 may also be formatted in an object form. The channel object 430 forwards the method names and parameters to the message queue object 440 by making a direct method call on the message queue object 440 and calling a method that stores the method names and parameters in a message queue. The location in memory of the message queue object 440 is given to the channel object 430 by the receiver object 350. The method called is referenced as "Add" 441.

The message queue object 440 is created by the receiver object 350. The message queue object 440 operates to store a plurality of method names and parameters. The receiver object 350 includes a separate thread of execution that reads the method names and parameters stored in the message queue object 440 and executes the methods on the receiver object 350. The receiver object 350 accesses the method names and parameters on the message queue object 440 by making a direct method call on the message queue object 440. The receiver object 350 calls a method on the message queue object 440, referenced as "Get" 442. The "Get" method 442 sends the method names stored in the message queue object 440 to the receiver object 350. The message queue object 440 allows the name of the methods stored to be executed by the receiver object 350 asynchronously.

According to an alternate embodiment of the present invention, a message queue method resides in the receiver object 350. Instead of forwarding the method names and parameters to the message queue object 440, the channel object 430 forwards the method names and parameters to the message queue method on the receiver object 350 by calling the message queue method. The name of the methods stored on the queue method are executed synchronously.

Figure 5:
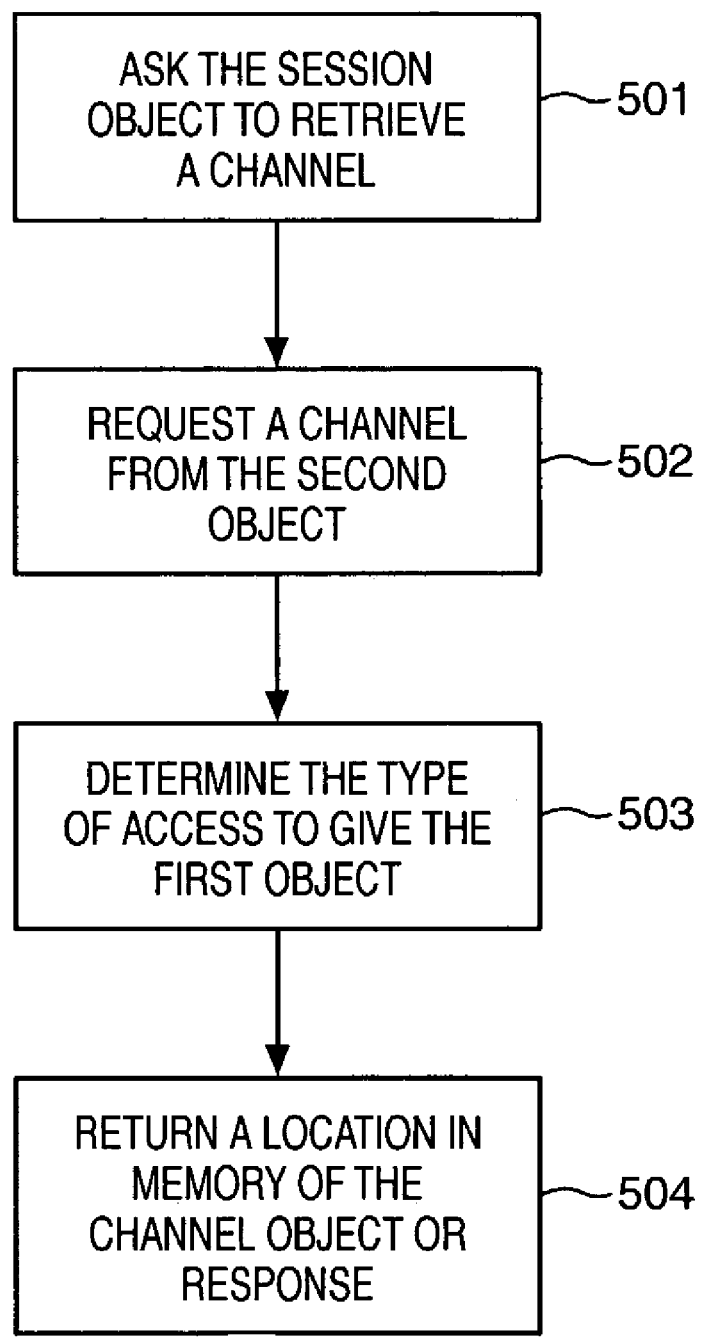
FIG. 5 is a flow chart illustrating a method for establishing a channel of communication between a first object and a second object.

FIG. 5 is a flow chart illustrating a method for negotiating a channel of communication according to an embodiment of the present invention as illustrated in FIG. 3. At step 501, the session object is asked to retrieve a channel of communication. According to an embodiment of the present invention, a first object wishing to communicate with a second object asks the session object by making a direct method call on the session object. The direct method call contains a location in memory of the session object, the name of the method in the session object for getting the channel of communication, and object identifiers (IDs) of the first object requesting the channel of communication and of the second object.

At step 502, a request is made to the second object for a channel of communication. According to an embodiment of the present invention, the session object makes the request by making a direct method call on the second object. The session object has a list of object identifiers of the objects operating in the run-time of the session and their corresponding locations in memory. With this information, the session object references the location in memory corresponding to the object ID of the second object. The direct method call made by the session object contains the location in memory of the second object, the name of the method in the second object for requesting a channel, and the object ID of the first object requesting the channel of communication.

At step 503, a determination is made to the type of access to give the first object. According to an embodiment of the present invention, the second object references information relating to the object ID of the first object to determine whether the first object is a trustable object. Depending on how trustable the first object is, the second object may decide to grant an open channel of communication to the first object, a restricted channel of communication where the methods and parameters sent by the first object are filtered, or not grant a channel of communication.

At step 504, a location in memory of the channel object or a response that no channel is to be granted is returned. According to an embodiment of the present invention, this information is returned to the session object. The session object proceeds to forward the information to the first object.

Figure 6:
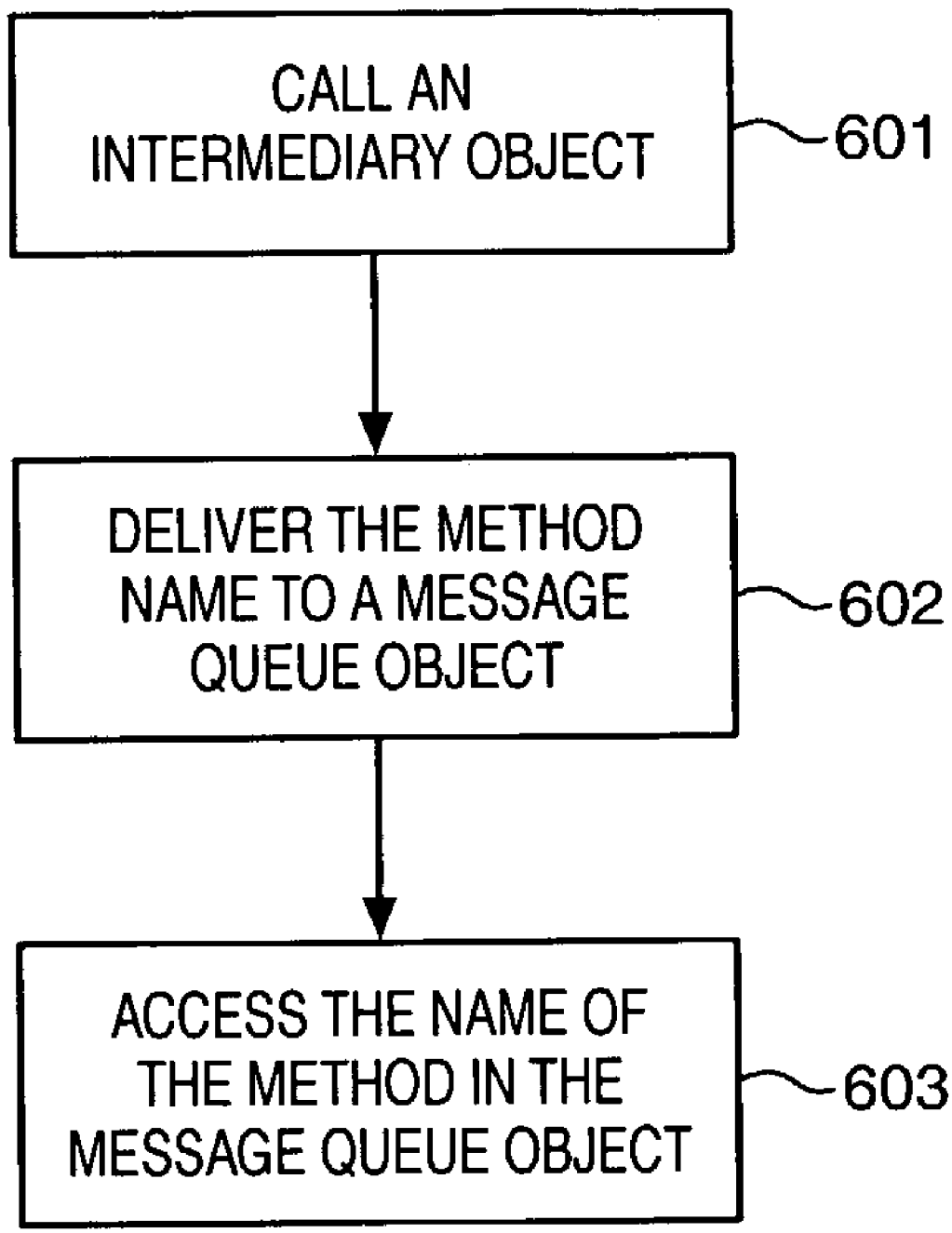
FIG. 6 is a flow chart illustrating a method for inter-object communication.

FIG. 6 is a flow chart illustrating a method for inter-object messaging a second object by a first object according to an embodiment of the present invention as illustrated in FIG. 4. At step 601, an intermediary object is called. According to an embodiment of the present invention, a direct method call is made by the first object on the intermediary object. The direct method call contains information regarding a location in memory of the intermediary object instead of a location in memory of the second object and a name of the method to be called on the second object.

At step 602, the name of the method is delivered to a message queue object. According to an embodiment of the present invention, the name of the method is delivered from the intermediary object to the message queue object by first creating a message object that contains the name of the method to be called on the second object and then making a direct method call from the intermediary object to a channel object. Calling the method on the channel object sends the message object to the message queue object which causes the name of the method to be delivered on the message queue object.

At step 603, the name of the method in the message queue is accessed by the second object. According to an embodiment of the present invention, the second object calls a method on the message queue object that causes the message object to be given to the second object. The second object then calls a method on the message object which causes the name of the method in the message object to be executed by the second object.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computerized method of communication between a first object and a second object, the method comprising:
    the first object receiving a location of a channel object to serve as a communication channel between the first object and the second object;
    creating an intermediary object by the first object;
    making a first direct method call on the intermediary object from the first object, the first direct method call having a name that corresponds to a name of a method to be called on the second object, and the first direct method call including a number of parameters necessary for executing the method on the second object;
    delivering the name of the method to be called on the second object from the intermediary object to a message queue object, said delivering from the intermediary object to the message queue object made by the channel object; and
    accessing the name of the method to be called on the second object in the message queue object from the second object.

2. The method of claim 1, wherein said delivering comprises:

creating a message object containing the name of the method to be called on the second object; and making a second direct method call from the intermediary object to the channel object that knows a location in memory of the message queue object to request the message object be sent to the message queue object.

3. The method of claim 1, wherein said accessing the name of the method in the message queue object comprises making a second direct method call from the second object to the message queue object to retrieve the name of the method on the message queue object.

4. The method of claim 1, further comprising executing the method accessed from the message queue object by the second object.

5. A computer-readable medium having stored thereon sequences of instructions, the sequences of instructions including instructions which, when executed by a processor, causes the processor to perform various processing, the sequences of instructions comprising:

a first sequence to create an intermediary object by a first object subsequent to said first object receiving a location of a channel object that serves as a communication channel between the first object and the second object, the first object and the second object being object-oriented programming objects;

a second sequence to make a first direct method call on the intermediary object from the first object, the first direct method call having a name that corresponds to a name of a method to be called on the second object, and the first direct method call including a number of parameters necessary for executing the method on the second object;

a third sequence to deliver the name of the method to be called on the second object from the intermediary object to a message queue object; and a fourth sequence to access the name of the method to be called on the second object in the message queue object from the second object.

6. The computer-readable medium of claim 5, further including:

a fifth sequence to create a message object containing the name of the method to be called on the second object; and a sixth sequence to make a second direct method call from the intermediary object to the channel object that knows a location in memory of the message queue object to request the message object be sent to the message queue object.

7. The computer-readable medium of claim 5, further including a seventh sequence to make a second direct method call from the second object to the message queue object to retrieve the name of the method on the message queue object.

8. The computer-readable medium of claim 5, further including an eighth sequence to execute the method accessed from the message queue object by the second object.

9. A computerized method of communication between a first object and a second object, the method comprising:

the first object receiving a location of a channel object to serve as a communication channel between the first object and the second object;

creating an intermediary object by the first object;

making a first direct method call on the intermediary object from the first object, the first direct method call having a name that corresponds to a name of a method to be called on the second object, and the first direct method call including a number of parameters necessary for executing the method on the second object;

making a second direct method call on the channel object by the intermediary object, the second direct method call including the name of the method to be called on the second object;

making a third direct method call on the message queue object to forward the name of the method to be called on the second object to the message queue object, the third direct method call made by the channel object; and making a fourth direct method call on the message queue object to access the name of the method to be called on the second object in the message queue object, the fourth direct method call made by the second object.

10. The method of claim 9, wherein said making the second direct method call on the channel object by the intermediary object comprises:

creating a message object containing the name of the method to be called on the second object; and making a fifth direct method call from the intermediary object to the channel object that knows a location in memory of the message queue object to request the message object be sent to the message queue object.

11. The method of claim 9, wherein said making the third direct method call on the message queue object comprises the channel object calling a method of the message queue object that stores the method names and parameters in a message queue.

12. A computerized method of communication between a first object and a second object, the method comprising:

the first object receiving a location of a channel object to serve as a communication channel between the first object and the second object;

creating an intermediary object by the first object;

making a first direct method call on the intermediary object from the first object, the first direct method call having a name that corresponds to a name of a method to be called on the second object, and the first direct method call including a number of parameters necessary for executing the method on the second object;

delivering the name of the method to be called on the second object from the intermediary object to a message queue method of the second object, said delivering performed by the channel object; and accessing the name of the method in the message queue method from the second object.

13. The method of claim 12, wherein said delivering comprises calling the message queue method.

14. The method of claim 12, further comprising synchronously executing the method accessed from the message queue method in the second object.

* * * * *